United States Patent
Charnock et al.

(10) Patent No.: US 10,826,796 B2
(45) Date of Patent: Nov. 3, 2020

(54) VIRTUAL CIRCUITS IN CLOUD NETWORKS

(71) Applicants: Nant Holdings IP, LLC, Culver City, CA (US); PacketFabric, LLC, Culver City, CA (US)

(72) Inventors: William Charnock, Culver City, CA (US); Richard Turkbergen, Culver City, CA (US); Patrick Soon-Shiong, Culver City, CA (US)

(73) Assignee: PacketFabric, LLC, Culver City, CA (US)

( * ) Notice: Subject to any disclaimer, the term of this patent is extended or adjusted under 35 U.S.C. 154(b) by 276 days.

(21) Appl. No.: 15/715,611

(22) Filed: Sep. 26, 2017

(65) Prior Publication Data

US 2018/0091384 A1 Mar. 29, 2018

Related U.S. Application Data

(60) Provisional application No. 62/400,065, filed on Sep. 26, 2016.

(51) Int. Cl.
*H04L 12/24* (2006.01)
*H04L 12/46* (2006.01)
(Continued)

(52) U.S. Cl.
CPC ...... *H04L 41/5041* (2013.01); *H04L 12/4633* (2013.01); *H04L 12/4641* (2013.01);
(Continued)

(58) Field of Classification Search
CPC ............ H04L 41/5041; H04L 12/4633; H04L 12/4641; H04L 41/5054; H04L 41/0883;
(Continued)

(56) References Cited

U.S. PATENT DOCUMENTS 4,982,421 A 1/1991 Kirsch et al.
5,924,014 A 7/1999 Vanden Heuvel et al.
(Continued)

FOREIGN PATENT DOCUMENTS

EP 1089521 A2 4/2001
KR 10-2015-0000152 1/2015
(Continued)

OTHER PUBLICATIONS

European Space Agency, Harmonization of DVB-RCS Management and Control planes, https://artes.esa.int/projects/harmonization-dvb-rcs-management-a- nd-control-planes-hmc, downloaded on Feb. 5, 2013, 5 pages.

(Continued)

*Primary Examiner* — Oanh Duong
(74) *Attorney, Agent, or Firm* — Mintz Levin Cohn Ferris Glovsky and Popeo, P.C.

(57) ABSTRACT

A network provisioning device comprises an administrative interface for instantiating a virtual circuit definition to communicatively couple a set of endpoint devices in a network fabric, and a virtual circuit constructor. The virtual circuit constructor converts the virtual circuit definition into Layer-2 provisioning commands, selects a target set of networking nodes that connect to the endpoint devices, and transmits the Layer-2 provisioning commands to the target set of networking nodes. VXLAN virtual circuit provisioning in the target set of networking nodes establishes a VXLAN circuit to communicatively couple the endpoint devices.

21 Claims, 5 Drawing Sheets

(51) Int. Cl.
*H04L 12/911* (2013.01)
*H04L 12/931* (2013.01)

(52) U.S. Cl.
CPC ...... *H04L 41/0883* (2013.01); *H04L 41/5054* (2013.01); *H04L 47/822* (2013.01); *H04L 49/354* (2013.01); *H04L 41/22* (2013.01); *H04L 41/5058* (2013.01); *H04L 41/5077* (2013.01); *H04L 2212/00* (2013.01)

(58) Field of Classification Search
CPC ..... H04L 47/822; H04L 49/354; H04L 41/22; H04L 41/5058; H04L 2212/00; H04L 41/5077
See application file for complete search history.

(56) References Cited

U.S. PATENT DOCUMENTS

| | | | |
|---|---|---|---|
| 6,078,810 | A | 6/2000 | Olds et al. |
| 6,081,525 | A | 6/2000 | Christie et al. |
| 6,195,037 | B1 | 2/2001 | Gross et al. |
| 6,611,867 | B1 | 8/2003 | Bowman-Amuah |
| 6,671,256 | B1 | 12/2003 | Xiong et al. |
| 6,973,027 | B1 | 12/2005 | Shaffer |
| 6,985,454 | B1 | 1/2006 | Wiedeman et al. |
| 7,013,335 | B2 | 3/2006 | Barnhouse et al. |
| 7,092,999 | B2 | 8/2006 | Levitan |
| 7,269,185 | B2 | 9/2007 | Kirkby et al. |
| 7,269,348 | B1 | 9/2007 | Tse-Au |
| 7,337,209 | B1 | 2/2008 | Barkai et al. |
| 7,352,745 | B2 | 4/2008 | Perera et al. |
| 7,366,125 | B1 | 4/2008 | Elliott |
| 7,398,088 | B2 | 7/2008 | Belkin et al. |
| 7,426,580 | B2 | 9/2008 | Monga |
| 7,548,545 | B1 | 6/2009 | Wittenschlaeger |
| 7,599,314 | B2 | 10/2009 | Wittenschlaeger |
| 7,639,699 | B2 | 12/2009 | Tallet et al. |
| 7,894,334 | B2 | 2/2011 | Wen et al. |
| 7,933,247 | B2 | 4/2011 | Gidwani |
| 8,107,476 | B2 | 1/2012 | MacLean et al. |
| 8,151,318 | B1 | 4/2012 | DeSanti et al. |
| 8,335,678 | B2 | 12/2012 | Hughes et al. |
| 8,345,778 | B2 | 1/2013 | Kennedy et al. |
| 8,370,831 | B1 | 2/2013 | Eng et al. |
| 8,493,889 | B2 | 7/2013 | Wittenschlaeger |
| 8,514,856 | B1 | 8/2013 | Gai |
| 8,717,895 | B2 | 5/2014 | Koponen |
| 8,830,873 | B2 | 9/2014 | Tomic et al. |
| 9,158,734 | B1 | 10/2015 | Prabhakara |
| 9,319,336 | B2 | 4/2016 | Thakkar |
| 9,363,204 | B2 | 6/2016 | Wittenschlaeger |
| 9,479,433 | B1 | 10/2016 | Lewis |
| 9,509,637 | B1 | 11/2016 | Shekhar |
| 9,642,179 | B2 | 5/2017 | Wittenschlaeger |
| 9,647,895 | B2 * | 5/2017 | Nair .................. H04L 41/0893 |
| 9,705,756 | B2 | 7/2017 | Low et al. |
| 9,813,959 | B2 | 11/2017 | Wittenschlaeger |
| 10,110,509 | B2 | 10/2018 | Wittenschlaeger |
| 2002/0072361 | A1 | 6/2002 | Knoblach et al. |
| 2002/0097725 | A1 | 7/2002 | Dighe et al. |
| 2002/0109879 | A1 | 8/2002 | Wing So |
| 2002/0159437 | A1 | 10/2002 | Foster et al. |
| 2003/0109220 | A1 | 6/2003 | Hadinger et al. |
| 2003/0117954 | A1 | 6/2003 | De Neve |
| 2003/0185148 | A1 | 10/2003 | Shinomiya et al. |
| 2003/0202465 | A1 | 10/2003 | Cain |
| 2004/0032874 | A1 | 2/2004 | Fujiyoshi |
| 2004/0116141 | A1 | 6/2004 | Loven |
| 2004/0210632 | A1 | 10/2004 | Carlson et al. |
| 2005/0259571 | A1 | 11/2005 | Battou |
| 2006/0077909 | A1 | 4/2006 | Saleh et al. |
| 2006/0171301 | A1 | 8/2006 | Casper et al. |
| 2006/0179147 | A1 | 8/2006 | Tran |
| 2006/0193473 | A1 | 8/2006 | Fu |
| 2006/0193474 | A1 | 8/2006 | Fransdonk et al. |
| 2006/0221865 | A1 | 10/2006 | Hawbaker |
| 2006/0280131 | A1 | 12/2006 | Rahman |
| 2007/0021052 | A1 | 1/2007 | Boice |
| 2007/0036178 | A1 | 2/2007 | Hares et al. |
| 2007/0061434 | A1 | 3/2007 | Schmieder et al. |
| 2007/0076599 | A1 | 4/2007 | Ayyagari et al. |
| 2007/0115806 | A1 | 5/2007 | Onorato et al. |
| 2007/0115967 | A1 | 5/2007 | Vandenberghe et al. |
| 2007/0121503 | A1 | 5/2007 | Guo et al. |
| 2007/0253329 | A1 | 11/2007 | Rooholamini et al. |
| 2007/0286198 | A1 | 12/2007 | Muirhead et al. |
| 2008/0043663 | A1 | 2/2008 | Youssefzadeh et al. |
| 2008/0049648 | A1 | 2/2008 | Liu |
| 2008/0155070 | A1 | 6/2008 | El-Damhougy et al. |
| 2008/0297406 | A1 | 12/2008 | Dragne et al. |
| 2010/0118740 | A1 | 5/2010 | Takacs et al. |
| 2010/0329247 | A1 | 12/2010 | Kennedy et al. |
| 2011/0032830 | A1 | 2/2011 | Merwe et al. |
| 2011/0083138 | A1 | 4/2011 | Sivasubramanian et al. |
| 2011/0188865 | A1 | 8/2011 | Lalonde et al. |
| 2011/0307716 | A1 | 12/2011 | Diab |
| 2012/0002640 | A1 | 1/2012 | Baluja et al. |
| 2012/0027018 | A1 | 2/2012 | Ilyadis |
| 2012/0086769 | A1 | 4/2012 | Huber et al. |
| 2012/0093030 | A1 | 4/2012 | Kim et al. |
| 2012/0120964 | A1 | 5/2012 | Koponen et al. |
| 2012/0155453 | A1 | 6/2012 | Vohra |
| 2012/0163189 | A1 | 6/2012 | Allan et al. |
| 2012/0297088 | A1 | 11/2012 | Wang et al. |
| 2013/0028091 | A1 | 1/2013 | Sun et al. |
| 2013/0107709 | A1 | 5/2013 | Campbell |
| 2013/0265880 | A1 | 10/2013 | Lee |
| 2013/0266019 | A1 | 10/2013 | Qu et al. |
| 2013/0304841 | A1 | 11/2013 | Hummel |
| 2013/0322445 | A1 | 12/2013 | Klein |
| 2013/0329728 | A1 | 12/2013 | Ramesh |
| 2014/0059111 | A1 | 2/2014 | Veeraiyan |
| 2014/0092907 | A1 * | 4/2014 | Sridhar ............... H04L 12/4633 370/392 |
| 2014/0115137 | A1 | 4/2014 | Keisam |
| 2014/0146817 | A1 | 5/2014 | Zhang |
| 2014/0169215 | A1 | 6/2014 | Rajendran et al. |
| 2014/0226659 | A1 * | 8/2014 | Tsirkin ................... H04L 45/74 370/390 |
| 2014/0325637 | A1 | 10/2014 | Zhang |
| 2014/0348006 | A1 | 11/2014 | Jain et al. |
| 2014/0348166 | A1 | 11/2014 | Yang et al. |
| 2014/0348168 | A1 | 11/2014 | Singh et al. |
| 2014/0355450 | A1 | 12/2014 | Bhikkaji et al. |
| 2015/0009992 | A1 | 1/2015 | Zhang |
| 2015/0010001 | A1 * | 1/2015 | Duda ...................... H04L 45/74 370/392 |
| 2015/0012621 | A1 | 1/2015 | Patwardhan et al. |
| 2015/0055651 | A1 * | 2/2015 | Shen .................. H04L 12/1854 370/390 |
| 2015/0058470 | A1 | 2/2015 | Duda |
| 2015/0063353 | A1 | 3/2015 | Kapadia et al. |
| 2015/0124586 | A1 | 5/2015 | Pani |
| 2015/0124821 | A1 | 5/2015 | Chu et al. |
| 2015/0124826 | A1 * | 5/2015 | Edsall ................. H04L 12/4633 370/392 |
| 2015/0180773 | A1 | 6/2015 | DeCusatis et al. |
| 2015/0200847 | A1 * | 7/2015 | Gourlay ................. H04L 49/70 370/392 |
| 2015/0200873 | A1 | 7/2015 | Wittenschlaeger |
| 2015/0200954 | A1 | 7/2015 | Gourlay et al. |
| 2015/0215211 | A1 | 7/2015 | Bhikkaji et al. |
| 2015/0229523 | A1 | 8/2015 | Park et al. |
| 2015/0236871 | A1 | 8/2015 | Kang |
| 2015/0256357 | A1 | 9/2015 | Rajendran et al. |
| 2015/0339212 | A1 | 11/2015 | Mehta et al. |
| 2015/0350095 | A1 | 12/2015 | Raney |
| 2015/0358232 | A1 | 12/2015 | Chen et al. |
| 2015/0379150 | A1 | 12/2015 | Duda |
| 2015/0381386 | A1 | 12/2015 | Sigoure et al. |
| 2015/0381484 | A1 | 12/2015 | Hira et al. |
| 2016/0036728 | A1 | 2/2016 | Duda |
| 2016/0119156 | A1 | 4/2016 | Drake et al. |
| 2016/0134513 | A1 | 5/2016 | Yang et al. |

(56) References Cited

U.S. PATENT DOCUMENTS

| | | | |
|---|---|---|---|
| 2016/0149808 A1 | 5/2016 | Cai et al. | |
| 2016/0150043 A1* | 5/2016 | Petronic | H04L 61/2546 |
| | | | 709/220 |
| 2016/0191381 A1 | 6/2016 | DeCusatis et al. | |
| 2016/0211989 A1 | 7/2016 | Jain et al. | |
| 2016/0226678 A1 | 8/2016 | Sridhar et al. | |
| 2016/0241515 A1 | 8/2016 | Pai et al. | |
| 2016/0253046 A1 | 9/2016 | Garrison et al. | |
| 2016/0261496 A1 | 9/2016 | Chang | |
| 2016/0294769 A1 | 10/2016 | Song et al. | |
| 2016/0323319 A1 | 11/2016 | Gourlay et al. | |
| 2016/0337474 A1* | 11/2016 | Rao | H04L 45/64 |
| 2017/0033992 A1 | 2/2017 | Dichtel et al. | |
| 2017/0048084 A1 | 2/2017 | Sigoure et al. | |
| 2017/0063614 A1* | 3/2017 | Hartwig | H04L 41/0883 |
| 2017/0070908 A1 | 3/2017 | Ogura | |
| 2017/0085502 A1* | 3/2017 | Biruduraju | H04L 12/4633 |
| 2017/0099160 A1 | 4/2017 | Mithyantha et al. | |
| 2017/0149583 A1 | 5/2017 | Hira et al. | |
| 2017/0170989 A1 | 6/2017 | Sridhar et al. | |
| 2017/0171056 A1 | 6/2017 | Doug et al. | |
| 2017/0207929 A1 | 7/2017 | Qian et al. | |
| 2017/0207992 A1 | 7/2017 | Huang et al. | |
| 2017/0208136 A1 | 7/2017 | Zhou | |
| 2017/0214545 A1 | 7/2017 | Cheng et al. | |
| 2017/0228251 A1 | 8/2017 | Yang et al. | |
| 2017/0244572 A1 | 8/2017 | Kuwata et al. | |
| 2017/0257260 A1 | 9/2017 | Govindan et al. | |
| 2017/0257306 A1 | 9/2017 | Huang et al. | |
| 2017/0257309 A1* | 9/2017 | Appanna | H04L 45/245 |
| 2017/0289031 A1 | 10/2017 | Duda | |
| 2017/0295130 A1* | 10/2017 | Mahajan | H04L 61/103 |
| 2017/0302476 A1 | 10/2017 | Yang et al. | |
| 2017/0310554 A1* | 10/2017 | Liu | H04L 41/12 |
| 2017/0310635 A1 | 10/2017 | Yang et al. | |
| 2017/0317850 A1 | 11/2017 | Huang et al. | |
| 2017/0331641 A1 | 11/2017 | Fu | |
| 2017/0359199 A9 | 12/2017 | Sigoure et al. | |
| 2018/0069754 A1* | 3/2018 | Dasu | H04L 12/4641 |
| 2018/0205623 A1* | 7/2018 | Gao | H04L 12/4633 |
| 2019/0327109 A1* | 10/2019 | Guichard | H04L 12/4604 |

FOREIGN PATENT DOCUMENTS

| | | |
|---|---|---|
| KR | 10-2015-001125 | 1/2015 |
| WO | WO-0117313 A1 | 3/2001 |

OTHER PUBLICATIONS

Malakooti, "Roadmap for Developing Reconfigurable Intelligent Internet Protocols for Space Communication Networks"; Report for Case Western ReserveUniversity, Jun. 29, 2004; pp. 1-23; version 7; Cleveland, Ohio.

Understanding the QFabric Switch Control Plane, https://juniper.net/techpubs/en.sub.--US/junos11.3/topics/concept/control--plane-q-fabric-understanding.html, Apr. 27, 2012, 2 pages, Juniper Networks.

Mahalingam, et al., Virtual eXtensible Local Area Network (VXLAN): A framework for overlaying virtualized layer 2 networks over layer 3 networks, 2014, 23 pages.

* cited by examiner

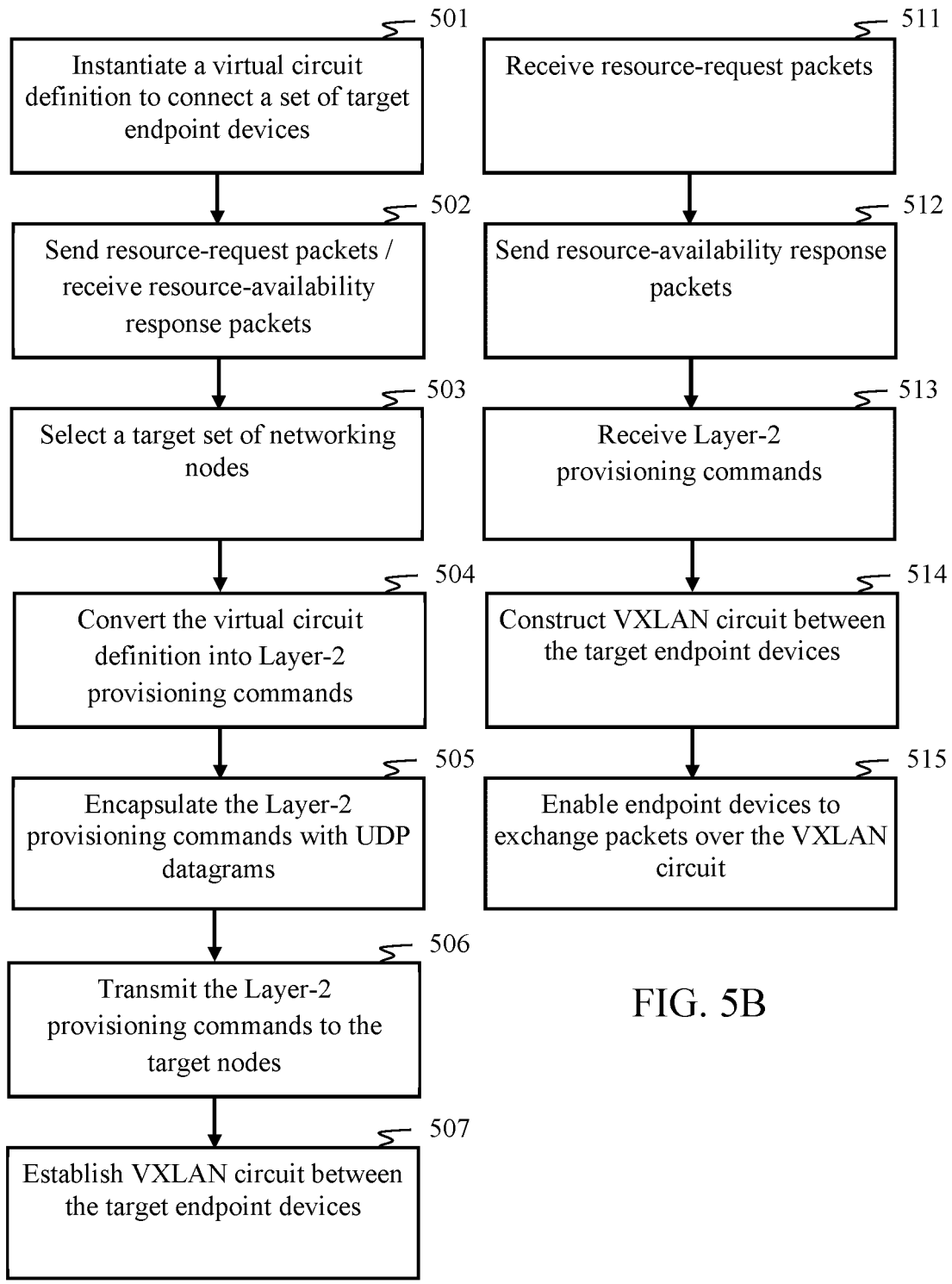

VIRTUAL CIRCUITS IN CLOUD NETWORKS

CROSS REFERENCE TO RELATED APPLICATIONS

This application claims the benefit of priority to U.S. provisional application 62/400,065 filed Sep. 26, 2016. This and all other extrinsic references referenced herein are incorporated by reference in their entirety.

FIELD OF THE DISCLOSURE

The field of the disclosure relates generally to cloud networks and, more particularly, to methods and apparatus to provision virtual circuits in cloud networks.

BACKGROUND

The background description includes information that may be useful in understanding the present invention. It is not an admission that any of the information provided herein is prior art or relevant to the presently claimed invention, or that any publication specifically or implicitly referenced is prior art.

Cloud-computing platforms are becoming popular with clients and customers by providing flexible, on-demand resources at a relatively low cost. A cloud-computing network, also known as a distributed computing network, enables clients to manage web-based applications and/or data resources by dynamically leasing computational resources and associated network resources from service providers. These web-based applications and/or data resources may be used by customers of the clients, individuals associated with the clients, and/or by the clients. This dynamic leasing of computational and other resources creates an appearance and function of a distributive computing network and, thus, can be referred to as virtualization of a computer network. Cloud-computing platforms employ virtualization of storage and computing resources. Accordingly, new resources provisioned for a client may be quickly added as needed within short periods of time by a service provider allocating an additional portion of shared resources to the client. Additionally, virtualization in cloud computing enables service providers to dynamically multiplex resources among multiple clients without dedicating individual physical resources to each client.

SUMMARY

The inventive subject matter includes provideing for apparatus, systems, and methods of provisioning a Virtual Extensible LAN (VXLAN) circuit in a network.

In an exemplary aspect of the disclosure, a network provisioning device comprises an administrative interface for instantiating a virtual circuit definition to communicatively couple a set of endpoint devices in a network fabric, and a virtual circuit constructor. The virtual circuit constructor converts the virtual circuit definition into Layer-2 provisioning commands, selects a target set of networking nodes that connect to the endpoint devices, and transmits the Layer-2 provisioning commands to the target set of networking nodes. VXLAN virtual circuit provisioning in the target set of networking nodes establishes a VXLAN circuit to communicatively couple the endpoint devices.

In one aspect, a method of provisioning a network fabric is presented. Responsive to inputs from an administrative interface, a virtual circuit definition can be instantiated to provide a virtual circuit communicatively coupling a plurality of target endpoint devices in a network fabric. A target set of nodes that are coupled to the target endpoint devices is selected. The virtual circuit definition is converted into Layer-2 provisioning commands, which are possibly encapsulated within UDP datagrams. The Layer-2 provisioning commands are transmitted to the target set of nodes to cause VXLAN virtual circuit provisioning in the target set of nodes to establish a VXLAN circuit among the target endpoint devices.

The administrative interface can enable customers in a cloud network to control provisioning of virtual circuits. The administrative interface can comprise controls to enable a customer to configure virtual circuits, perform troubleshooting, measure traffic, select Quality of Service, provide MAC filtering, and/or configure packet filtering.

Various objects, features, aspects, and advantages of the inventive subject matter will become more apparent from the following detailed description, along with the accompanying drawing figures in which like numerals represent like components.

BRIEF DESCRIPTION OF THE DRAWING

In the following description, various aspects are described with reference to the following drawings, in which:

FIGS. 3, 4, 5A and 5B are flow diagrams that depict exemplary methods configured in accordance with aspects of the disclosure.

DETAILED DESCRIPTION

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In exemplary aspects, the various servers, systems, databases, and/or interfaces exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The word "exemplary" is used herein to mean "serving as an example, instance, or illustration." Any aspect described herein as "exemplary" is not necessarily to be construed as preferred or advantageous over other embodiments.

Figure 1:
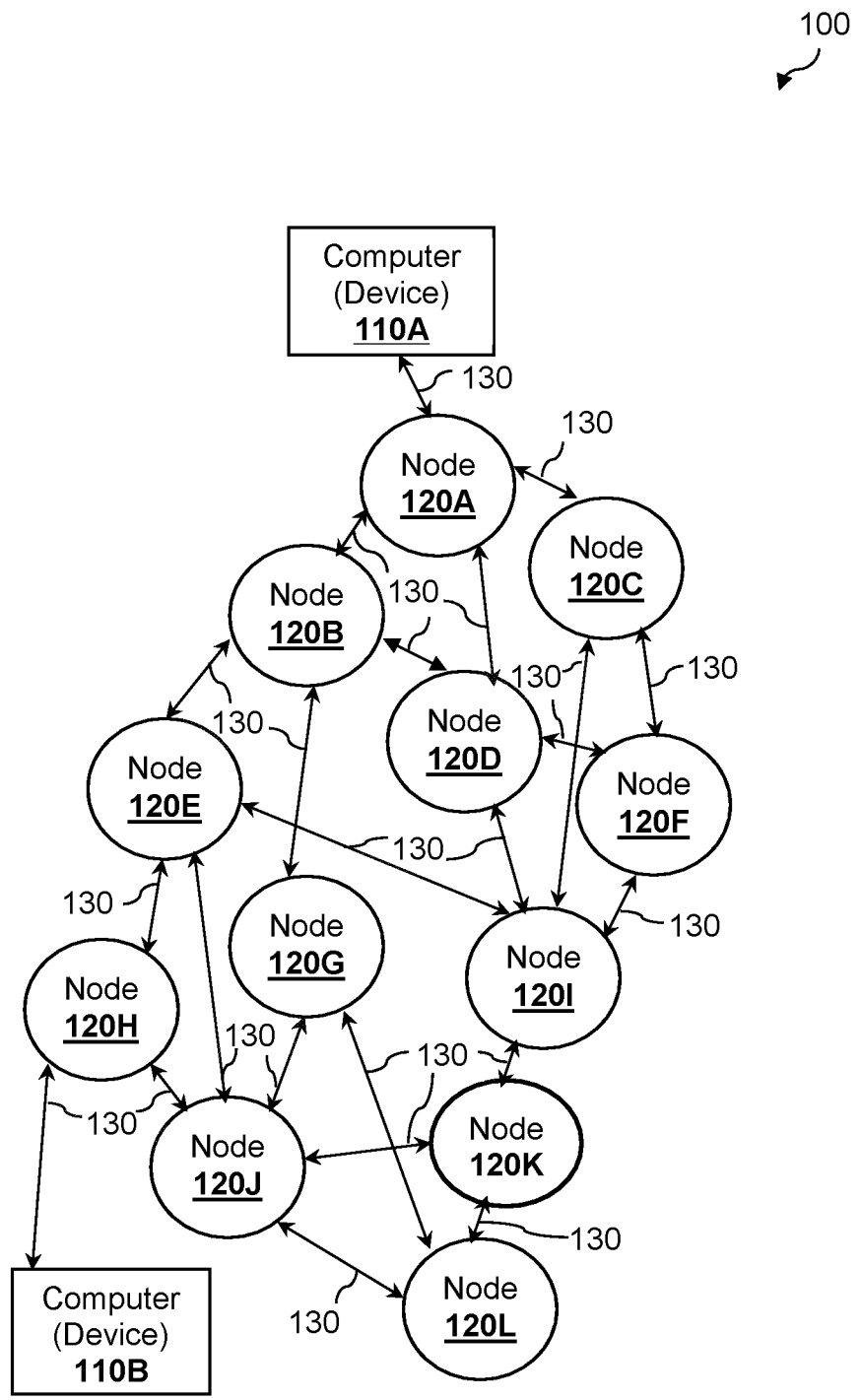
FIG. 1 depicts an example network fabric that can be configured in accordance with aspects of the disclosure.

FIG. 1 depicts an examplary network fabric 100 as a distributed networking fabric comprising a plurality of networking nodes 120 (e.g., nodes 120A through 120L), where fabric 100 can span across geographical distances. Examplary networking nodes 120 can include networking switches, possibly offered by Cisco, Juniper, or other switch providers. Furthermore, the networking nodes can include routers, access points, wireless devices, hubs, multi-homed computers, or other types of computing devices capable of routing network traffic. Fabric 100 provides fabric resources (e.g., communication, storage, computation, etc.) for one or more of devices 110 (e.g., devices 110A through 110B). Thus, device 110A can coordinate activities or other communications with device 110B through nodes 120. Aspects disclosed herein can be implemented in a network fabric, such as network fabrics described in U.S. Pat. Nos. 9,363,204, 7,548,545, and 7,599,314, which are incorporated by reference in their entireties.

Figure 2:
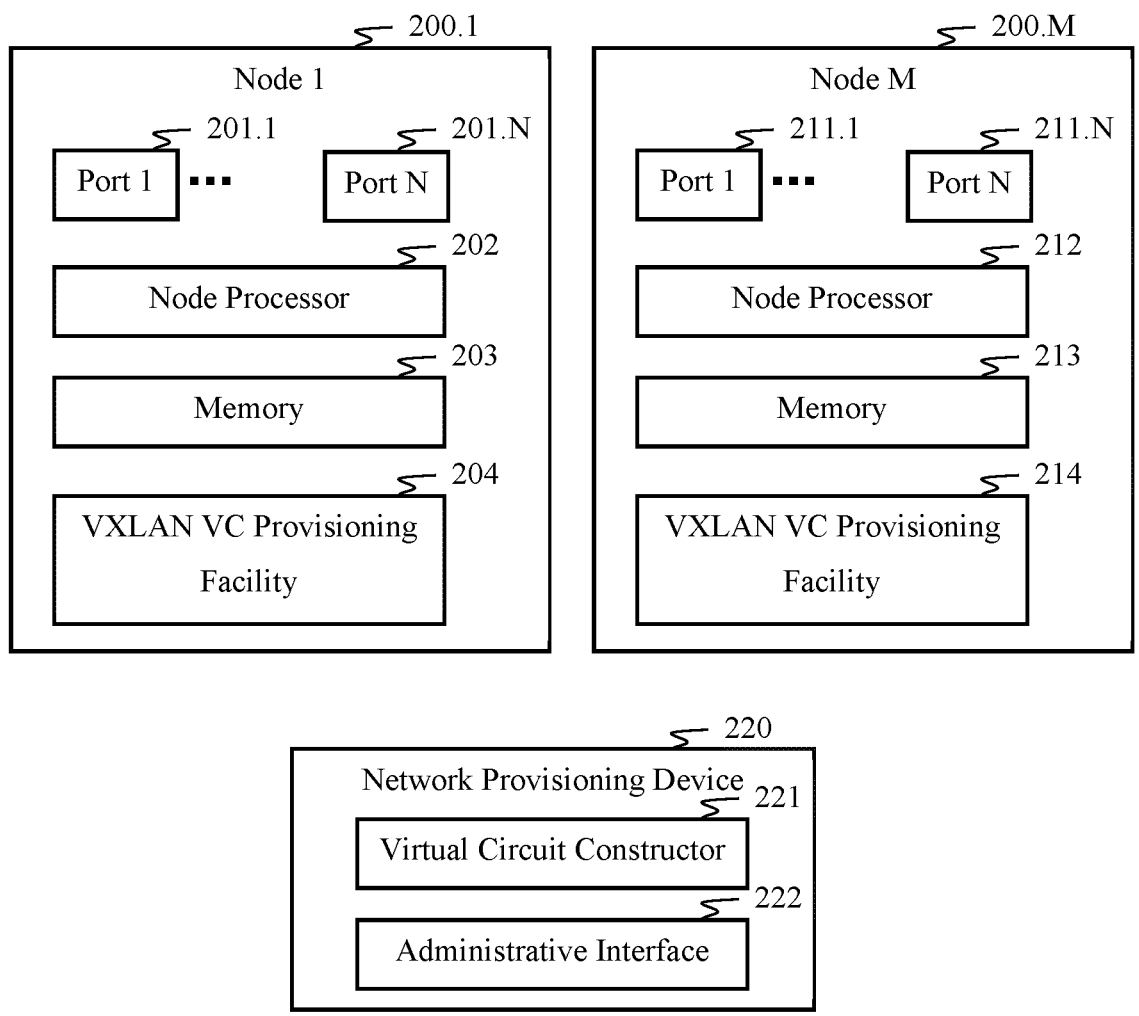
FIG. 2 is a block diagram of a network provisioning system in accordance with some aspects of the disclosure.

FIG. 2 depicts a network provisioning system in accordance with some aspects of the disclosure. A plurality of networking nodes 200.1-200.M are shown, which can be communicatively coupled via a network fabric (not shown). For example, node 200.1 comprises physical ports 201.1-201.N, a node processor 202, a non-transitory computer readable node memory 203, and a Virtual Extensible LAN (VXLAN) virtual circuit provisioning facility 204. Node 200.N comprises physical ports 211.1-211.N, a node processor 212, a non-transitory computer-readable node memory 213, and a VXLAN virtual circuit provisioning facility 214. The nodes 200.1-200.M can include at least one of a switch, a router, a gateway, an access point, and a hub.

The processor 202 in the VXLAN virtual circuit provisioning facility 204 executes instructions stored in the non-transitory computer-readable memory 203 to provision VXLAN virtual circuits for endpoint devices (not shown) coupled with at least one of the physical ports 201.1-201.N. VXLAN is a network virtualization technology that can mitigate scalability problems associated with large cloud computing deployments. It uses a VLAN-like encapsulation technique to encapsulate MAC-based OSI Layer-2 Ethernet frames within Layer-4 UDP packets, using 4789 as the default IANA-assigned destination UDP port number. VXLAN is documented by the IETF in RFC 7348 (https://tools.ietf.org/html/rfc7348), which is incorporated by reference in its entirety.

The network provisioning system also comprises a network provisioning device 220, which can comprise an administrative interface 221 and a virtual circuit constructor 222. The administrative interface 221 is communicatively coupled to the network fabric (not shown). Administrative interface 221 provides for instantiating a virtual circuit definition in memory, the virtual circuit being configured for a set of endpoints coupled to at least some of the networking nodes. In some aspects of the disclosure, the virtual circuit constructor 222 can be configured to perform methods disclosed herein, such as the method depicted in FIG. 3.

In accordance with some aspects, the virtual circuit constructor 222 is configured to convert 301 the virtual circuit definition into Layer-2 provisioning commands, identify 302 a target set of nodes from the plurality of networking nodes 200.1-200.M having target endpoints, transmit 303 the Layer-2 provisioning commands to each node in the target set of nodes, and instantiate 304 a VXLAN virtual circuit object. Step 304 can comprise causing the VXLAN virtual circuit provisioning facilities of the target set of nodes to establish a VXLAN circuit among endpoint devices coupled to at least some nodes in the target set of nodes. The VXLAN circuit can be represented as the VXLAN virtual circuit object in the memory of the network provisioning device.

It should be appreciated that steps illustrated in the flow diagrams depicted herein can be implemented in a different order, concurrently, and/or can comprise additional steps, such as in accordance with the various aspects of the disclosure. Devices depicted herein, such as the network provisioning device 220 (or one or more of its components 221 and 222) can comprise at least one non-transitory computer-readable memory that stores instructions configured to perform steps illustrated in the drawing figures. The network provisioning device 220 (or one or more of its components 221 and 222) can comprise at least one processor that is configurable to execute the instructions stored in the at least one non-transitory computer-readable memory.

Figure 3:
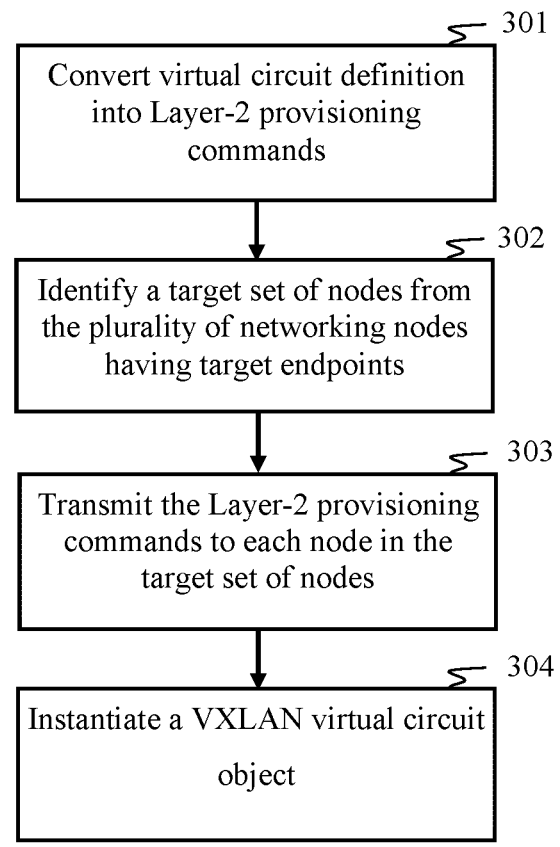

In some aspects, steps shown in FIG. 3 can be performed in a different order. By way of example, and without limitation, the virtual circuit constructor 222 can be configured to identify 302 a target set of nodes from the plurality of networking nodes 200.1-200.M that are communicatively coupled to the target endpoints, convert 301 the virtual circuit definition into Layer-2 provisioning commands, transmit 303 the Layer-2 provisioning commands to each node in the target set of nodes, and instantiate 304 a VXLAN virtual circuit object.

In some aspects, the administrative interface 222 comprises at least one of a web interface, a GUI, an API, and a web-based API. The API can comprise one of JavaScript Object Notation, XML, and YAML. In some aspects, the network provisioning device 220 comprises an HTTP server. The network provisioning device 220 can further include a virtual circuit database (not shown) storing the instantiated VXLAN virtual circuit object. By way of example, and without limitation, the virtual circuit database (not shown) can be configured to store at least 10,000,000 VXLAN virtual circuits.

In some aspects, the virtual circuit constructor 221 encapsulates the Layer-2 provisioning commands within UDP datagrams. The virtual circuit constructor 221 can send resource request packets to the plurality of networking nodes. Furthermore, the virtual circuit constructor 221 might receive resource availability response packets from at least some of the networking nodes. The target set of nodes can include at least one of a switch, a router, a gateway, an access point, and a hub.

In some aspects, the VXLAN VC Provisioning Facility 204 can comprise a card installed in the node 200.1. In some aspects, the VXLAN VC Provisioning Facility 204 can reside outside the node 200.1. In some aspects, the VXLAN VC Provisioning Facility 204 can comprise a virtual machine.

Figure 4:
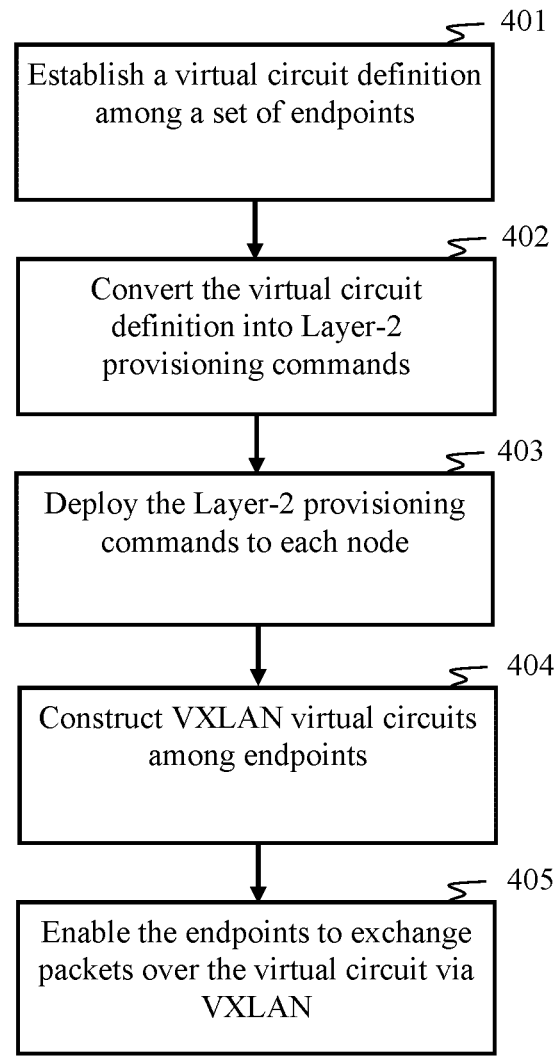

In accordance with some aspects of the disclosure, each node 200.1-200.M comprises a VXLAN-enabled provisioning agent (which can include a network administration engine) comprising at least one non-transitory computer-readable memory that stores instructions configured to perform the steps illustrated in FIG. 4.

In accordance with some aspects of the disclosure, FIG. 4 functional steps can be embodied in a combination of software instructions residing on non-transitory computer-readable memory and one or more processors that operate according to the instructions. The VXLAN-enabled provisioning agent can be configured to establish 401 a virtual circuit definition among a set of endpoints, convert 402 the virtual circuit definition into Layer-2 provisioning commands, deploy 403 the Layer-2 provisioning commands to each node, construct 404 VXLAN virtual circuits among endpoints according to the Layer-2 provisioning commands, and enable 405 the endpoints to exchange packets over the virtual circuit via VXLAN. This can involve encapsulating the Layer-2 provisioning commands into VXLAN packets.

FIG. 5A is a flow diagram that depicts a network-provisioning method, which may be performed by the network provisioning device 220, for example. In some aspects, the network provisioning device 220 comprises at least one non-transitory computer-readable memory that stores instructions configured to perform at least some of the steps illustrated in FIG. 5A.

A virtual circuit definition is instantiated 501 to provide a virtual circuit communicatively coupling a plurality of target endpoint devices. Step 501 may be responsive to inputs from an administrative interface, such as the administrative interface 222. The administrative interface 222 can enable customers in a cloud network to control provisioning of virtual circuits. The administrative interface 222 can comprise a control for configuring the virtual circuits, a control for troubleshooting the virtual circuits, a control for measuring traffic on the virtual circuits, a control for selecting Quality of Service, a control for providing MAC filtering, and/or a control to configure packet filtering. Such controls may be accessible by the customer.

In some aspects, the network provisioning device 220 can send 502 resource-request packets to networking nodes and receive resource-availability response packets from the nodes. A target set of nodes is selected 503 from the nodes that are connected the target endpoint devices. The virtual circuit definition is converted 504 into Layer-2 provisioning commands, which may be encapsulated 505 with UDP datagrams and then transmitted 506 to the target set of nodes to cause VXLAN virtual circuit provisioning facilities in the target set of nodes to establish 507 a VXLAN circuit among the target endpoint devices.

FIG. 5B is a flow diagram that depicts a network-provisioning method, which may be performed by a network node 200.1-200.M, for example. In some aspects, the network node 200.1-200.M comprises at least one non-transitory computer-readable memory that stores instructions configured to perform at least some of the steps illustrated in FIG. 5B.

The node can receive 511 resource-request packets sent by a network provisioning device (e.g., device 202) and transmit 512 resource-availability response packets to the network provisioning device. If selected as one of a target set of nodes by the network provisioning device, the node receives 513 Layer-2 provisioning commands, possibly encapsulated with UDP datagrams. The node constructs 514 a VXLAN circuit between target endpoint devices and enables 515 the endpoint devices to exchange packets over the VXLAN circuit.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A network provisioning system, comprising:
a plurality of networking nodes, each comprising:
a set of physical ports;
a processor;
a non-transitory computer readable node memory;
a Virtual Extensible LAN (VXLAN) virtual circuit provisioning facility configured to execute instructions stored in the non-transitory computer readable memory by way of the processor and provision VXLAN virtual circuits for at least one endpoint device coupled to at least one of the physical ports; and
a network provisioning device, comprising:
an administrative interface for instantiating a virtual circuit definition for a virtual circuit communicatively coupling a set of endpoint devices coupled to at least some of the networking nodes;
a virtual circuit constructor configured to:
convert the virtual circuit definition into Layer-2 provisioning commands;
select a target set of nodes from the plurality of networking nodes having target endpoint devices;
transmit the Layer-2 provisioning commands to each node in the target set of nodes; and
instantiate a VXLAN virtual circuit object by causing VXLAN virtual circuit provisioning facilities of the target set of nodes to establish a VXLAN circuit to communicatively couple the target endpoint devices.

2. The system of claim 1, wherein the administrative interface comprises at least one of a web interface, a GUI, an API, and a web-based API.

3. The system of claim 1, wherein the network provisioning device comprises an HTTP server.

4. The system of claim 1, wherein the network provisioning device further includes a virtual circuit database storing the instantiated VXLAN virtual circuit object.

5. The system of claim 1, wherein the virtual circuit constructor encapsulates the Layer-2 provisioning commands within UDP datagrams.

6. The system of claim 1, wherein the target set of nodes includes at least one of a switch, a router, a gateway, an access point, and a hub.

7. The system of claim 1, wherein the virtual circuit constructor sends resource request packets to the plurality of networking nodes and receives resource availability response packets from at least some of the plurality of networking nodes.

8. A network provisioning device, comprising:
a non-transitory computer readable memory;
a processor coupled with the non-transitory computer readable memory, wherein the processor, at least in part based on executing instructions stored in the non-transitory computer readable memory, is caused to at least:
provide an administrative interface configured to instantiate a virtual circuit definition to provide a virtual circuit communicatively coupling a plurality of target endpoint devices that are coupled to a plurality of networking nodes; and
provide a virtual circuit constructor configured to:
convert the virtual circuit definition into Layer-2 provisioning commands;
identify a target set of nodes from the plurality of networking nodes coupled to the plurality of target endpoint devices; and
transmit the Layer-2 provisioning commands to the target set of nodes to establish a Virtual Extensible LAN (VXLAN) circuit among the plurality of target endpoint devices.

9. The network provisioning device of claim 8, wherein the virtual circuit constructor configures VXLAN virtual circuit provisioning facilities of the target set of nodes to establish the VXLAN circuit.

10. The network provisioning device of claim 8, wherein the administrative interface comprises a customer user interface configured to enable each of a plurality of customers in a cloud network to control provisioning of virtual circuits.

11. The network provisioning device of claim 10, wherein the user interface comprises at least one of a control for configuring the virtual circuits, a control for troubleshooting the virtual circuits, a control for measuring traffic on the virtual circuits, a control for selecting Quality of Service, a control for providing MAC filtering, and a control to configure packet filtering.

12. The network provisioning device of claim 8, wherein the administrative interface comprises at least one of a web interface, a GUI, an API, and a web-based API.

13. The network provisioning device of claim 8, wherein the network provisioning device comprises an HTTP server.

14. The network provisioning device of claim 8, wherein the network provisioning device further includes a virtual circuit database storing an instantiated VXLAN virtual circuit object that represents the VXLAN circuit.

15. The network provisioning device of claim 8, wherein the virtual circuit constructor encapsulates the Layer-2 provisioning commands within UDP datagrams.

16. The network provisioning device of claim 8, wherein the virtual circuit constructor sends resource request packets to the plurality of networking nodes and receives resource availability response packets from at least some of the plurality of networking nodes.

17. In a network comprising a network provisioning device and a plurality of networking nodes, each node comprising a Virtual Extensible LAN (VXLAN) virtual circuit provisioning facility configured to provision VXLAN virtual circuits for endpoint devices coupled with at least one physical port of the each node, a method performed by the network provisioning device, comprising:
responsive to inputs from an administrative interface, instantiating a virtual circuit definition to provide a virtual circuit communicatively coupling a plurality of target endpoint devices coupled to the plurality of networking nodes;
selecting a target set of nodes from the plurality of networking nodes coupled to the target endpoint devices;
converting the virtual circuit definition into Layer-2 provisioning commands;
transmitting the Layer-2 provisioning commands to the target set of nodes to cause VXLAN virtual circuit provisioning facilities in the target set of nodes to establish a VXLAN circuit among the plurality of target endpoint devices.

18. The method of claim 17, wherein the administrative interface comprises a customer user interface configured to enable each of a plurality of customers in a cloud network to control provisioning of virtual circuits.

19. The method of claim 17, further comprising storing an instantiated VXLAN virtual circuit object that represents the VXLAN circuit.

20. The method of claim 17, wherein transmitting comprises encapsulating the Layer-2 provisioning commands within UDP datagrams.

21. The method of claim 17, further comprising sending resource request packets to the plurality of networking nodes and receiving resource availability response packets from at least some of the plurality of networking nodes.

* * * * *